Oct. 10, 1939.   J. T. W. MOSELEY   2,175,444
ROTARY MOTOR
Filed May 19, 1938   2 Sheets-Sheet 2
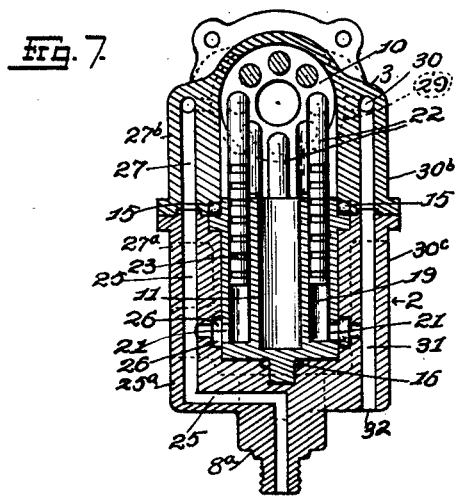
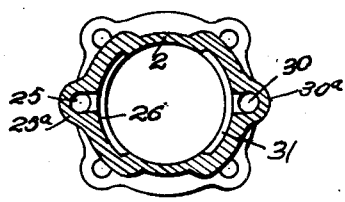
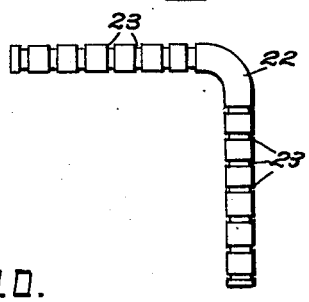
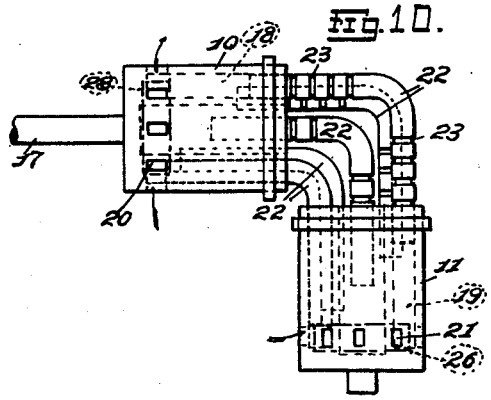
Inventor
James T. W. Moseley
By
Attorney Patented Oct. 10, 1939

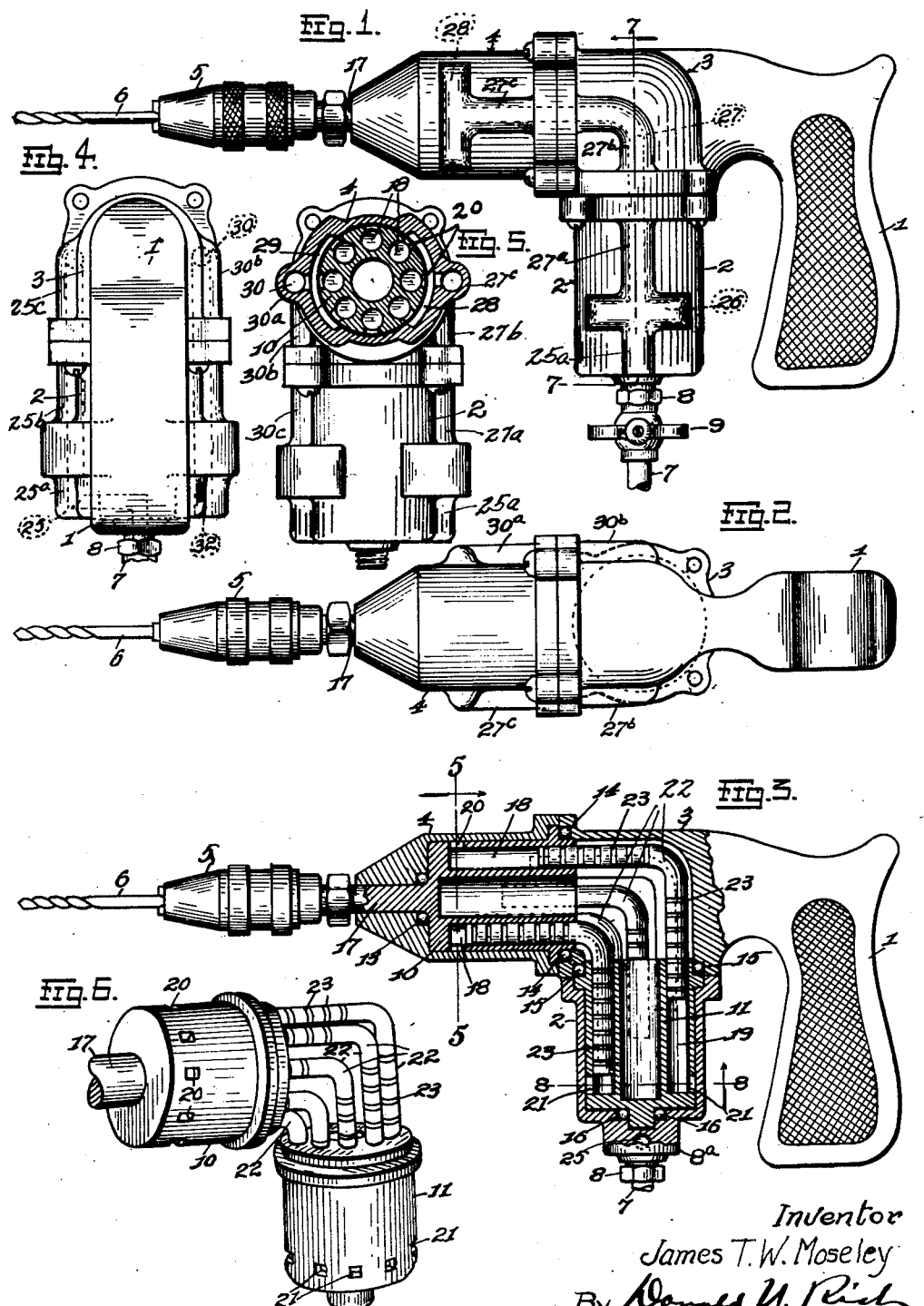

2,175,444

UNITED STATES PATENT OFFICE 2,175,444

ROTARY MOTOR

James T. W. Moseley, Webster Groves, Mo., assignor of one-half to Carter Carburetor Corporation, St. Louis, Mo., a corporation of Delaware Application May 19, 1938, Serial No. 208,939

2 Claims. (Cl. 121—62)

This invention relates to power tools and consists particularly in a novel device for utilizing fluid under pressure for operating a rotary tool such as a drill.

It is an object of the invention to provide a rotary power tool device which operates with a minimum of vibration and applies a minimum of reactive torque to the operating handle.

Another object is to provide a rotary tool of the above type which can be formed as a relatively small, compact unit so as to facilitate operation thereof in restricted quarters.

These objects and other more detailed objects hereafter appearing are attained substantially by the device illustrated in the accompanying drawings in which:

Fig. 1 is a side view of the novel device with a drill applied thereto.

Fig. 2 is a top view of the device.

Fig. 3 is a side view shown partly in vertical section on the center line.

Fig. 4 is a rear end view of the device.

Fig. 5 is a vertical transverse section taken substantially on the line 5—5 of Fig. 3.

Fig. 6 shows a part of the operating mechanism disassembled from the casing and other parts.

Fig. 7 is a vertical sectional view taken substantially on the line 7—7 of Fig. 1.

Fig. 8 is a horizontal sectional view taken substantially on the line 8—8 of Fig. 3 and showing the bottom portion of the casing only.

Fig. 9 is a disassembled view showing one of the angular driving rods and

Fig. 10 is a partly diagrammatic view showing the operating parts.

The device includes, broadly, an operating handle 1 to be gripped by the operator, a right angle casing composed of parts 2, 3 and 4, and a jaw or chuck 5 mounting a drill 6. A tube 7, leading to a source of compressed air or other fluid under pressure, is connected to casing part 2 by means of a coupling 8, a valve 9 being provided for controlling the supply of pressure fluid.

Casing portions 2, 3 and 4 form a right angle chamber having smooth cylindrical walls at each end receiving barrels 10 and 11. Ball bearings are provided at 13, 14, 15 and 16 to facilitate rotation of the barrels relative to the casing.

Projecting from barrel 10 through the adjacent end of the casing is a shaft 17 to which is secured chuck or jaw 5. Formed around the axis of each barrel 10 and 11 are a series of cylinders 18 and 19, each closed at the outer end and open at the inner end. Each of the cylinders is provided with a port, as at 20 and 21 (Fig. 6) opening from the outer, closed end of the cylinder through the wall of the barrel.

Connecting barrels 10 and 11 are a series of right angle driving rods 22, each having legs paralleling the axes of barrels 10 and 11 and closely fitting and longitudinally slidable within one of the cylinders 18 and 19 in each barrel. The legs of these driving rods are circumferentially grooved as at 23 to insure proper lubrication of the rubbing portions of the cylinder walls and driving rods. Preferably, the open space in casing portion 3 will be utilized for storing a supply of lubricating material.

The pressure fluid enters the bottom of casing portion 2 through boss 8a, forming a part of coupling 8, and thence passes through passage 25 in boss 25a to an elongated inlet port 26, adjacent cylinder ports 21 in barrel 11 and through a passage 27 in bosses 27a, 27b, and 27c to an elongated inlet port 28, adjacent cylinder ports 20 in barrel 10. On the opposite side of casing portion 4 there is provided an elongated exhaust port 29 communicating by means of passage 30 in bosses 30a, 30b and 30c with an elongated exhaust port 31 in housing part 2, opposite inlet port 26 and thence with the atmosphere as at 32.

In operation, fluid under pressure is supplied through tube 7 past control valve 9 to passages 25 and 27 and elongated inlet ports 26 and 28. As indicated in Figs. 5 and 10, inlet port 28 is disposed to communicate with each cylinder port 20 while barrel 10 is rotating through approximately 45 degrees. Driving rods 22 are arranged so that when each cylinder port 20 first communicates with its inlet port 28, the corresponding driving rod is at or near the inner end of its travel in the cylinder. Thereafter the compressed fluid admitted to the cylinder applies axial pressure to the driving rod, forcing the same outwardly from the chamber, which movement applies rotational pressure through the opposite leg of the driving rod to the other barrel 11. Inlet port 26 bears the same relationship to cylinder ports 21 in barrel 11 as does inlet port 28 to cylinder ports 20 in barrel 10. Accordingly, simultaneous axial pressures are applied oppositely to both ends of the driving rods, resulting in rotational movement of both barrels 10 and 11, the movement of barrel 10, in turn, driving chuck or jaw 5 and drill 6.

Again referring to Figs. 5 and 10, it will be seen that a number of cylinder ports 20 and 21 are exposed to elongated inlet ports 26 and 28 at the same time. Thus, when each cylinder port is about to be cut off from the corresponding inlet port, which occurs when the corresponding driving rod 22 is at or near the outer end of its travel in the cylinder, two other chamber ports are in communication with the inlet port and the corresponding driving rods actuated. This results in smooth rotational movement of barrels 10 and 11 as long as fluid pressure is applied to inlet ports 26 and 25.

As each cylinder port is cut off from the inlet port, there is a travel of approximately 45 degrees, while the corresponding driving rod is passing over dead center at the end of its driving stroke, before this port is brought into communication with exhaust port 29 or 31 on the opposite side of the casing. Thereupon, during inward travel of the driving rod in its cylinder and during approximately 45° rotation of the barrel, fluid is exhausted from the cylinder through passages 30 and 32. After each cylinder port is cut off from its exhaust port, the barrel rotates approximately 45° before the cylinder port again communicates with its inlet port to complete the cycle.

The device illustrated is particularly adapted for operation by compressed air but I contemplate that the broad principle may be utilized in a combustion engine.

The device will operate, though not as efficiently, if axial pressure is applied to only one end of the driving rod. In this case one end of each driving rod need be merely guided by a rotating member having a longitudinally slidable lateral bearing on the driving rod. The application of axial pressure oppositely to both ends of the driving rods, as shown, is preferable since it tends to dampen the reactive torque produced and prevents binding of the driving rods in their guides. The number of driving rods used may be substantially varied from the eight used in the present instance, it being possible to operate the device with only one rod. The barrels may be mounted with their axes at angles other than a right angle, if desired. Also the arrangement of the controlling valve and operating handle as well as the means for attachment of a tool may be varied as will occur to those skilled in the art. The exclusive use of all modifications as come within the scope of the appended claims is contemplated.

I claim:

1. In a motor of the type described, a sectional housing including angularly arranged outer cylindrical end sections formed with outer end walls one of which includes a central drive opening and the other a central socket, the inner ends of said outer sections being formed with flanges having inner annular grooves, an intermediate angular housing section flanged at its extremities and each flange being formed with annular grooves for registration with the annular recesses of the end sections, the sections of said housing each being formed on opposite sides with registering ducts which normally communicate with each other and terminate in transverse elongated inwardly extending openings adjacent the outer ends of the end sections, rotating barrels in the end housing sections each formed with a plurality of parallel elongated piston receiving openings, passages extending through the walls of the barrels near their outer ends and communicating with each of the piston receiving openings, the inner ends of each barrel having an outwardly extending annular flange for arrangement within the annular guideways provided by the registering recesses at the contacting flanges, bearings in said guideways engaging the inner faces of the outwardly extending flanges of said barrels, bearings in the end walls of the outer cylindrical housing sections for engaging the outer ends of said barrels, driving rods each having angularly disposed legs slidably fitting in said piston receiving openings, intake and exhaust connections for transfer of fluid through the ducts in the housing and into the piston receiving opening and through the passages in the wall of the barrels.

2. A portable fluid motor for driving rotary tools, a sectional motor housing including angularly arranged end sections and an intermediate angular connecting section, one of the end sections having a drive shaft opening therethrough and each end section being formed with annular grooves in its inner end wall face, rotary barrels in each end wall section, said barrels each being provided with a flange at its inner end for arrangement within the grooves of the end sections, the end walls of the intermediate connecting section being notched to receive bearing members and said bearing members engaging and confining the barrel flanges within their grooves, a plurality of piston receiving openings in each barrel, angular drive rods having their extremities operating in said piston openings, ducts in the walls of the housing section and in the barrels for the intake and exhaust of fluid under pressure, and a handle member carried by the intermediate housing section and extending parallel to and in spaced relation with one of the end housing sections.

JAMES T. W. MOSELEY.